United States Patent [19]

Arthur

[11] 4,430,775

[45] Feb. 14, 1984

[54] MUFFLER SHIELD BANDING STRAP

[75] Inventor: James C. Arthur, Columbus, Ind.

[73] Assignee: Arvin Industries, Inc., Columbus, Ind.

[21] Appl. No.: 330,561

[22] Filed: Dec. 14, 1981

[51] Int. Cl.³ .................... B65D 63/04; F16L 33/00
[52] U.S. Cl. ............................. 24/20 CW; 24/20 EE
[58] Field of Search ............ 24/20 CW, 20 EE, 20 R, 24/20 W, 23 W, 23 EE; 29/509

[56] References Cited

U.S. PATENT DOCUMENTS

| | | | |
|---|---|---|---|
| 2,249,764 | 7/1941 | Hothersall | 24/20 EE |
| 2,876,514 | 3/1959 | Murphy | 24/20 |
| 3,188,706 | 6/1965 | Partridge | 24/20 EE |
| 3,295,176 | 1/1967 | Bright | 24/20 CW |
| 3,303,669 | 2/1967 | Oetiker | 24/20 CW |
| 3,357,388 | 12/1967 | Dunn | 29/509 |
| 3,402,436 | 9/1965 | Oetiker | 24/20 R |
| 3,475,793 | 11/1969 | Oetiker | 24/20 R |
| 3,510,918 | 5/1970 | Oetiker | 24/20 CW |
| 3,523,337 | 8/1970 | Oetiker | 24/20 CW |
| 3,789,463 | 2/1974 | Oetiker | 24/20 CW |
| 3,869,944 | 3/1975 | Oetiker | 24/20 CW |
| 4,222,155 | 9/1980 | Oetiker | 24/20 R |
| 4,237,584 | 12/1980 | Oetiker | 24/20 CW |
| 4,299,012 | 11/1981 | Oetiker | 24/20 CW |
| 4,315,348 | 1/1982 | Oetiker | 24/20 CW |
| 4,315,349 | 1/1982 | Stolz | 24/33 C |
| 4,315,558 | 2/1982 | Katayama | 181/228 |

OTHER PUBLICATIONS

"The Everlock Charlotte Keystone Clamp System", Everlock Charlotte, Microdot Fastening Systems, Special Components Division, Pineville, North Carolina.
"Oetiker Ears . . . have 'Dimples'!", Oetiker, Inc., Livingston, New Jersey.

Primary Examiner—Paul J. Hirsch
Attorney, Agent, or Firm—Barnes & Thornburg

[57] ABSTRACT

A banding strap for attaching a heat shield to a muffler comprises a strap for encircling the muffler and heat shield, the strap including an underlying end segment and an overlying end segment, each including outwardly projecting shoulder sections providing abutments for crimping to interlock the end segments and tighten the strap around the muffler and heat shield. The outwardly projecting shoulder section in the overlying end segment forms an inwardly opening bight for receiving the outwardly projecting shoulder section in the underlying end segment. Each shoulder section includes an inwardly projecting indentation so that the indentation of one of the shoulder sections nests within the indentation of the other of the shoulder sections when the shoulder sections are engaged to prevent lateral misalignment of the end segments with respect to each other.

28 Claims, 7 Drawing Figures

U.S. Patent  Feb. 14, 1984  Sheet 1 of 2  4,430,775
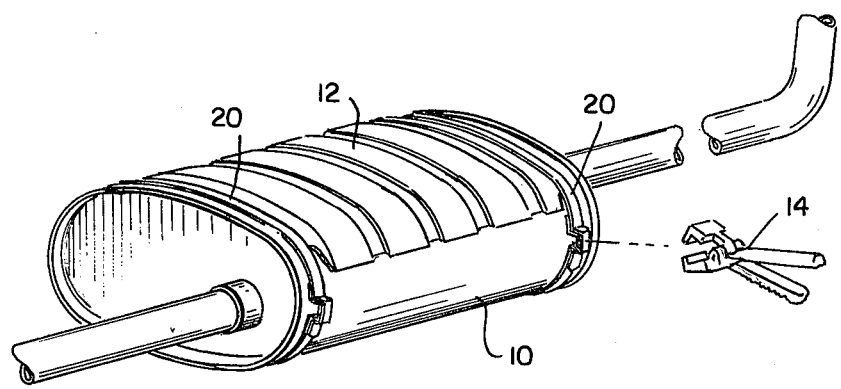
FIG. 1
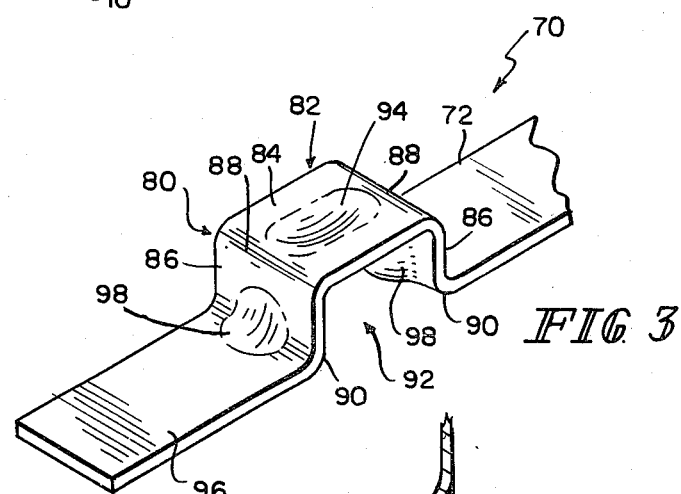
FIG. 3
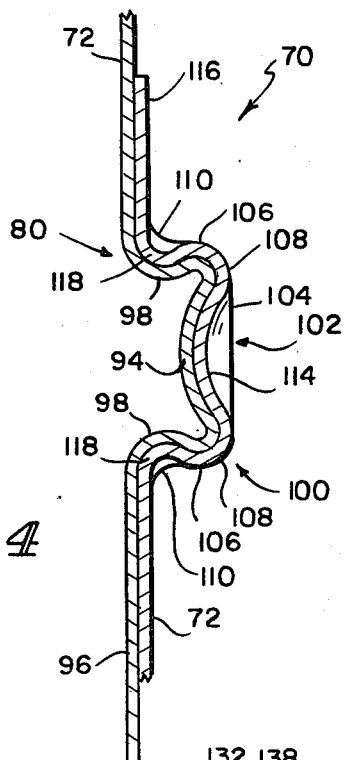
FIG. 4
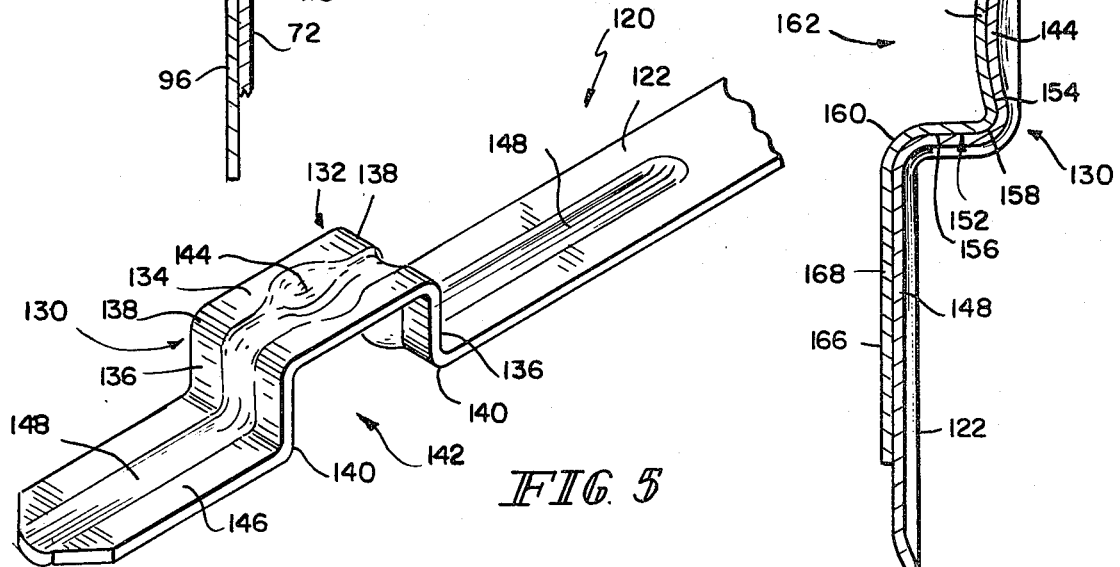
FIG. 5
FIG. 6

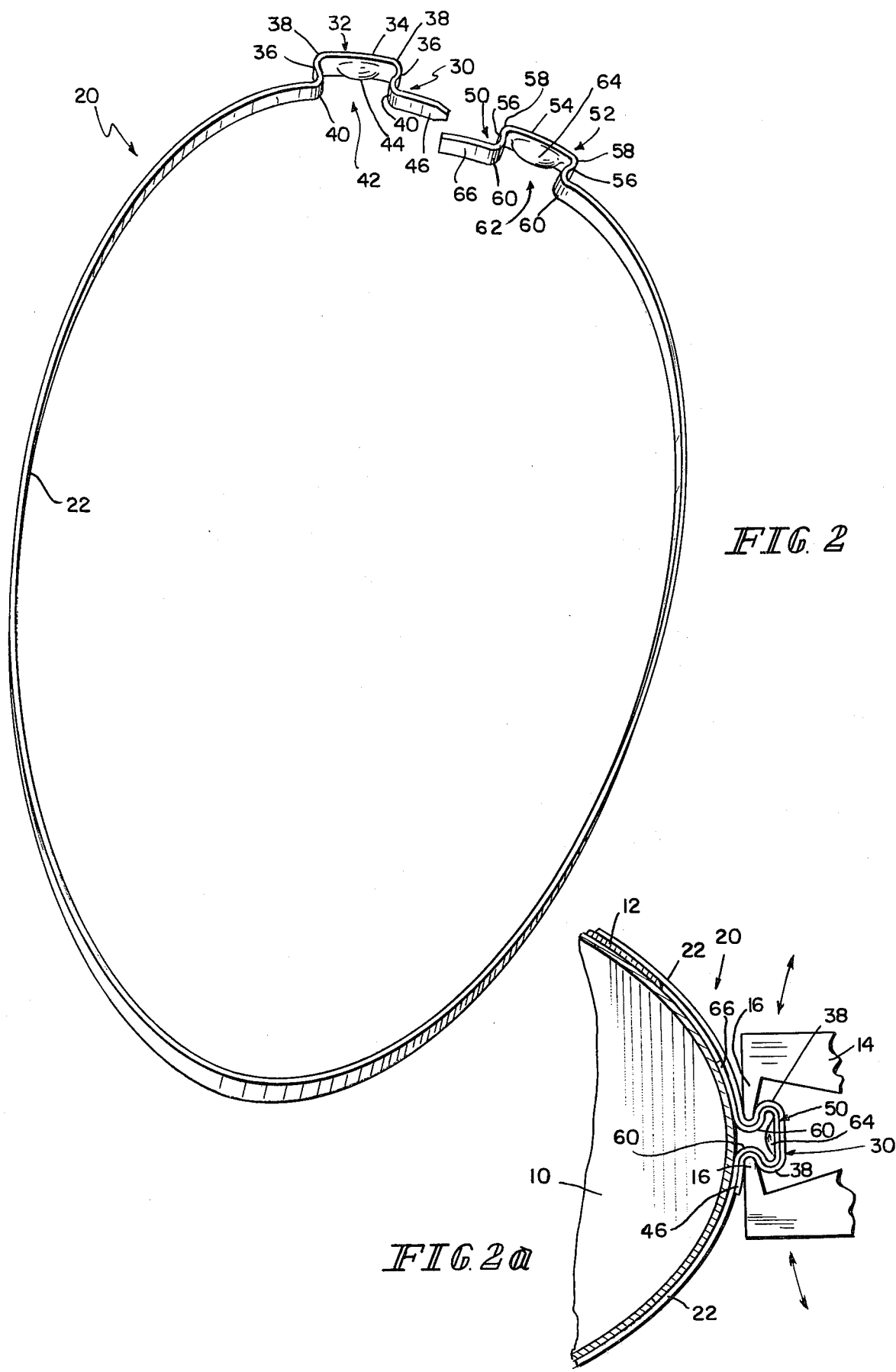

MUFFLER SHIELD BANDING STRAP

The present invention relates to bands for encircling and joining parts, and more particularly to improvements in such a band which increase its strength and facilitate the tightening of the band around the parts.

Clamps for joining one tubular member to another are generally well known to those skilled in the art. Some of these conventional clamps include a one-piece band which is sleeved over the tubular members and thereafter tightened. Other clamps include a strap having ends which are initially not connected and means such as screws or clips for connecting the two ends and tightening the strap. Hose clamps have been developed which include interconnecting ends which can be crimped to tighten the clamp around a tubular fitting and the tubular member being joined thereto. However, when the interconnecting portions of the ends are crimped, they have a tendency to buckle, thereby weakening the connection; and once they are crimped, the interconnecting portions may become separated due to lateral movement with respect to each other. Furthermore, during the crimping operation, the interconnecting portions may become laterally misaligned or it may be difficult to keep the portions laterally aligned.

In the manufacture of mufflers, catalytic converters, and exhaust pipes, it is common to attach a heat shield to these exhaust assemblies. Heretofore, the heat shield has been attached with a strap having ends which are interconnected either by a clip or a screw and weld nut. Therefore, joining heat shields to exhaust assemblies in the conventional manner requires numerous components and, in some cases, costly equipment and tooling. These and other problems associated with conventional banding techniques for attaching heat shields to exhaust assemblies are overcome by the banding strap of the present invention.

It is one object of the present invention to provide a banding strap for joining two parts, which strap is easy to install using relatively simple, uncomplicated assembly tooling.

It is another object of the present invention to provide a banding strap for joining two parts which eliminates the need for clips, nuts, washers, or screws for connecting the ends of the strap and for tightening the strap around the parts.

Yet another object of the present invention is to provide a banding strap for joining two parts having increased rigidity and strength in the interconnecting end segments of the strap in comparison to conventional one-piece banding straps and which further prevents lateral misalignment of the interconnecting end segments with respect to each other.

A further object of the present invention is to provide a banding strap for joining two parts which can be assembled over components in areas otherwise inaccessible to conventional banding straps and which eliminates sharp corners protruding perpendicular to the assembled components.

These objectives are achieved by providing a banding strap which includes a flexible strap for encircling the parts to be joined, the strap including an underlying end segment, an overlying end segment, and interengageable means for joining the end segments and for tightening the strap around the parts. The interengageable means include a first outwardly projecting shoulder section in the overlying end segment forming an inwardly opening bight and a second outwardly projecting shoulder section in the underlying end segment which is received in the bight of the first shoulder section. The interengageable means further includes an indentation in the first shoulder section and an indentation in the second shoulder section such that the indentation in one of the first and second shoulder sections nests in the indentation of the other of the first and second shoulder sections when the second shoulder section is received in the bight of the first shoulder section to prevent buckling during tightening and to further prevent lateral misalignment of the end segments with respect to each other.

In one illustrative embodiment, the indentations are formed in central portions of the outwardly projecting shoulder sections, and each indentation projects inwardly so that the indentation in the first outwardly projecting shoulder section nests in the indentation in the second outwardly projecting shoulder section.

In another illustrative embodiment, indentations are formed in central portions of the shoulder sections and are also formed in side portions of the shoulder sections. Each of the indentations projects inwardly so that the indentations in the central portion and side portions of the first shoulder section nest in the indentations in the central portion and side portions, respectively, of the second shoulder section when the second shoulder section is received in the bight of the first shoulder section.

In a further illustrative embodiment, indentations are formed in the central portions of the shoulder sections, and elongated indentations extend therefrom along the sides of the shoulder sections and along the strap in the longitudinal direction of the strap. These indentations also project inwardly so that the indentation in the central portion of the first shoulder section nests in the indentation of the central portion of the second shoulder section, and the elongated longitudinally extending indentation of the first shoulder section nests in the elongated longitudinally extending indentations of the second shoulder section.

Other objects and advantages of the present invention will become apparent in view of the following detailed description of embodiments thereof exemplifying the best mode of carrying out the invention as presently perceived, which description should be considered in conjunction with the accompanying drawings, in which:

FIG. 1 is a perspective view of a muffler and a heat shield attached to the muffler employing a banding strap embodying the present invention;

FIG. 2 is a perspective view of an embodiment of the banding strap shown in FIG. 1;

FIG. 2a is a sectional view, partly cross-sectioned, of the muffler, heat shield, and banding strap of FIG. 1 showing the tightening of the banding strap.

FIG. 3 is a perspective view of an underlying end segment of another embodiment of the banding strap shown in FIG. 1;

FIG. 4 is a cross-sectional view of interconnected overlying and underlying end segments of the embodiment shown in FIG. 3;

FIG. 5 is a perspective view of an overlying end segment of another embodiment of the banding strap shown in FIG. 1; and FIG. 6 is a cross-sectional view of interconnected overlying and underlying end segments of the embodiment shown in FIG. 5.

Referring to FIG. 1, a muffler or catalytic converter 10, which for illustrative purposes is elliptical in shape, has a heat shield 12 attached thereto by banding straps 20 constructed according to the present invention. Straps 20 are tightened around the muffler 10 and heat shield 12 using a relatively simple crimping tool 14 in a manner to be described later. Although for illustrative purposes the banding straps 20 are described in applications related to attachment of heat shields to mufflers, catalytic converters, or other exhaust system components, it is not intended that the banding strap of the present invention be limited to such applications. The banding strap 20 may be used in any application where it is desirable to join two parts in a tightly secure relationship.

Referring now to FIG. 2, one embodiment of a banding strap 20 constructed according to the present invention includes an elongated band or strap 22 constructed of a flexible material such as aluminized steel or stainless steel. The strap 22 includes an overlying end segment 30 with an outwardly projecting formation 32 formed therein. Formation 32 includes a central section 34, opposed side sections 36, outer shoulder sections 38 connecting the side sections 36 to the central section 34, and inner shoulder sections 40 connecting the side sections 36 to the remainder of the strap 22. The sections 34, 36, 38, and 40 of the formation 32 form an inwardly opening channel or bight 42. The central section 34 includes an inwardly projecting dimple or indentation 44 having a generally oval shape. The extremity 46 of the overlying end segment 30 provides a tongue for overlapping an underlying end segment 50 of the strap 22.

In the illustrative embodiment shown in FIG. 2, the outer shoulder sections 38 are scribed along arcs having a radius of 0.076 inch (0.193 cm). The inner shoulder sections 40 are scribed along arcs having a radius of 0.0625 inch (0.159 cm). The dimple or indentation 44 has gradually inwardly sloping sides having a longitudinal radius of 0.312 inch (0.792 cm) and a transverse radius of 0.070 inch (0.178 cm). As can best be seen in FIG. 2, the side sections 36 are generally S-shaped in cross section. In particular, the distance between the inner shoulder sections 40 is generally less than the distance between the outer shoulder sections 38. The reason for this shape will be explained later.

Continuing to refer to FIG. 2, the strap 22 also includes an underlying end segment 50. The underlying end segment includes an outwardly projecting formation 52 which is received in the channel or bight 42 of the overlying end segment 30 to interconnect the end segments 30 and 50. The formation 52 includes a central section 54, opposed side sections 56, outer shoulder sections 58 connecting the side sections to the central section 54, and inner shoulder sections 60 connecting the side sections 56 to the remainder of the strap 22. The sections 54, 56, 58, and 60 of the formation 52 form an inwardly opening channel or bight 62. An inwardly projecting dimple or indentation 64 is formed in the central section 54. The extremity 66 of the end segment 50 provides a tongue which underlies the overlying end segment 30.

In the illustrative embodiment shown in FIG. 2, the outer shoulder sections 58 of the underlying end segment 50 are scribed along arcs having a radius of 0.04 inch (0.102 cm). The inner shoulder sections 60 are scribed along arcs having a radius of 0.0985 inch (0.250 cm). The dimple or indentation 64 has gradually inwardly sloping sides having a longitudinal radius of 0.348 inch (0.884 cm) and a transverse radius of 0.106 inch (0.269 cm). The side sections 56 are also generally S-shaped in cross section, as can best be seen in FIG. 2. The distance between the inner shoulder sections 60 is generally less than the distance between the outer shoulder sections 58.

When the formation 52 is received in the bight or channel 42 of the formation 30, it snaps into engagement as the outer shoulder sections 58 of formation 50 slide past the inner shoulder sections 40 of the formation 30. This "snap-in" feature prevents the formations 30 and 50 from springing apart before they can be crimped together. Furthermore, the dimple 44 of the overlying end segment 30 nests in the dimple 54 of the underlying end segment to prevent lateral misalignment during the initial engagement of the end segments 30 and 50 and the subsequent crimping operation. Once formation 52 is received in the bight 42 of formation 32, the shoulder sections and side sections of the formations 32 and 52 provide abutments for the crimping tool 14.

As shown in FIG. 2a, the crimping tool 14 includes fingers 16 which engage the shoulder sections and side sections of the formations 32 and 52. Fingers 16 are movable in the directions of the arrows in FIG. 2a. By forcing the fingers 16 toward each other, the side sections 36 and 56 and the inner shoulder sections 4 and 60 of the formations 32 and 52, respectively, are crimped inwardly to interlock the formations 32 and 52 and at the same time tighten the strap 22 around the heat shield 12 and muffler 10. Dimples 44 and 64 add material strength and stiffness to the central sections 34 and 54 of the formations 32 and 52. Furthermore, during the crimping operation, the dimples 44 and 64 prevent the central sections 34 and 54 from buckling outwardly. This feature eliminates the need for an anvil over the central sections 34 and 54 during the crimping operation, and thereby simplifies the crimping tool 14. Therefore, the dimples 44 and 64 simplify the forming tool 14 without sacrificing joint integrity and materially strengthen the joint itself.

Referring now to FIGS. 3 and 4, another embodiment of a banding strap 70 constructed according to the present invention includes an elongated strap 72 having an underlying end segment 80, as shown in FIG. 3. The underlying end segment 80 includes an outwardly projecting formation 82 which is received in the channel or bight of an overlying end segment 100, as shown in FIG. 4. The formation 82 includes a central section 84, opposed side sections 86, outer shoulder sections 88 connecting the side sections 86 to the central section 84, and inner shoulder sections 90 connecting the side sections 86 to the remainder of the strap 72. The sections 84, 86, 88, and 90 of the formation 82 form an inwardly opening channel or bight 92. An inwardly projecting dimple or indentation 94 having an oval shape is formed in the central section 84 of the formation 52. The extremity 96 of the underlying end segment 80 underlies the overlying end segment 100 as shown in FIG. 4. Inwardly projecting dimples or indentations 98 are also formed in the side sections 86 and inner shoulder sections 90.

The strap 72 also includes an overlying end segment 100, as can best be seen in FIG. 4. The overlying end segment 100 includes an outwardly projecting formation 102. The formation 102 includes a central section 104, opposed side sections 106, outer shoulder sections 108 connecting the side sections 106 to the central section 109, and inner shoulder sections 110 connecting the side sections 106 to the remainder of the strap 72. The sections 104, 106, 108, and 110 of the formation 102 form an inwardly opening channel or bight for receiving the formation 82 of the underlying end segment 80 as shown in FIG. 4. An inwardly projecting dimple or indentation 114 is formed in the central section 104 and nests in the dimple or indentation 94 in the formation 82 when the formation 82 is received in the channel or bight of the formation 102. The extremity 116 of the overlying end segment 100 overlies the underlying end segment 80, as shown in FIG. 4. Dimples or indentations 118 are formed in the side sections 106 and the inner shoulder sections 110 of the formation 102. These dimples or indentations 118 nest in the dimples or indentations 98 in the formation 82 when the formation 82 is received in the channel or bight of the formation 102.

In the illustrative embodiment shown in FIGS. 3 and 4, the side sections 86 and 106 of the underlying and overlying end segments 80 and 100, respectively, are planar and generally perpendicular to the central sections 84 and 104 of the end segments 80 and 100, respectively. This is different than the generally S-shape of the side sections 36 and 56 in the embodiment shown in FIG. 2. The outer shoulder sections 88 and 108 are scribed along arcs having the same radii as the outer shoulder sections 38 and 58 described above, i.e., 0.076 inch (0.193 cm) and 0.04 inch (0.102 cm), respectively. The dimples 94 and 114 in the central sections 84 and 104, respectively, have gradually inwardly sloping sides having the same longitudinal and transverse radii as the indentations 44 and 64 described above, i.e., 0.312 inch (0.792 cm) and 0.070 inch (0.178 cm) and 0.348 inch (0.884 cm) and 0.106 inch (0.269 cm), respectively. The dimples or indentations 98 have a radius which is the same as the radius of the inner shoulder sections 60 of the underlying end segment 50 described above, i.e., 0.0985 inch (0.250 cm). The dimples or indentations 118 have a radius which is the same as the radius of the inner shoulder sections 40 of the formation 32 of the overlying end section 30 described above, i.e., 0.0625 inch (0.159 cm). Therefore, the "snap-in" feature described above, when the formation 82 is received in the bight of the formation 102, is produced by the dimples or indentations 98 and 118. The interconnection of the end segments 80 and 100 and tightening of the banding strap 70 by crimping are accomplished in the same manner as described above and shown in FIG. 2a. In addition to further preventing lateral misalignment during the crimping operation, dimples 98 and 118 also serve to eliminate the tendency of the overlying end segment 100 to spring back from the underlying end segment 80 once the joint is formed. Thus, the dimples 98 and 118 create a tighter joint between the end segments 80 and 100, further strengthening the joint.

Referring now to FIGS. 5 and 6, another embodiment of a banding strap 120 constructed according to the present invention includes a strap 122. The strap 122 includes an overlying end segment 130, as shown in FIG. 5. The overlying end segment 130 includes an outwardly projecting formation 132. The formation 132 includes a central section 134, opposed side sections 136, outer shoulder sections 138 connecting the side sections 136 to the central section 134, and inner shoulder sections 140 connecting the side sections 136 to the remainder of the strap 122. The sections 134, 136, 138, and 140 form an inwardly opening channel or bight 142 for receiving a formation 152 of an underlying end segment 150, as shown in FIG. 6. An inwardly projecting dimple or indentation 144 is formed in the central section 134 of the formation 132. The dimple 144 has gradually inwardly sloping sides having a longitudinal radius of 1.00 inch (2.54 cm) and a transverse radius of 0.070 inch (0.178 cm). The extremity 146 of the overlying end segment 130 overlies the underlying end segment 150, as shown in FIG. 6. Elongated indentations 148 extend longitudinally along the overlying end segment 130 from the dimple or indentation 144 through the outer shoulder sections 138, along the side sections 136 through the inner shoulder sections 140, along the extremity 146, and along the strap 122. The indentations 148 has a transverse radius of 0.070 inch (0.178 cm). At the outer shoulder sections 138, the indentations 148 are on a radius of 0.076 inch (0.193 cm). The inner shoulder sections 140 are scribed along arcs having a radius of 0.062 inch (0.157 cm).

The strap 122 also includes an underlying end segment 150, as best shown in FIG. 6. The underlying end segment 150 includes an outwardly projecting formation 152 which is received in the channel or bight 142 of the formation 132. The formation 152 includes a central section 154, opposed side sections 156, outer shoulder sections 158 connecting the side sectiosn 156 to the central section 154, and inner shoulder sections 160 connecting the side sections 156 to the remainder of the strap 122. These sections 154, 156, 158, and 160 form a channel or bight 162. An inwardly projecting dimple or indentation 164 is formed in the central section 154 of the formation 152, and has gradually inwardly sloping sides having a longitudinal radius of 1.036 inch (2.63 cm) and a transverse radius of 0.106 inch (0.269 cm). The extremity 166 of the underlying end segment 150 underlies the overlying end segment 130, as best shown in FIG. 6. Elongated indentations 168 extend longitudinally along the underlying end segment 150 from the dimple or indentation 164 through the outer shoulder sections 158, along the side sections 156, through the inner shoulder sections 160, along the extremity 166, and the strap 122. The indentations 168 have a transverse radius of 0.106 inch (0.269 cm). At the outer shoulder sections 158, the end indentations 168 are on a radius of 0.040 inch (0.102 cm). The inner shoulder sections 160 are scribed along arcs having a radius of 0.098 inch (0.249 cm).

When the formation 152 is received in the bight 142 of formation 132, the indentation 144 nests in the indentation 164, and indentations 148 nest in the indentations 168 to prevent lateral misalignment of the end segments 130 and 150 with respect to each other. The interconnection of the end segments 130 and 150 and tightening of the bonding strap 120 by crimping are accomplished in the same manner as described above and shown in FIG. 2a. In addition to providing assistance in aligning the end segments 130 and 150 during the crimping operation, indentations 148 and 168 further reduce the spring-back between the end segments 130 and 150. Thus, indentations 148 and 168 further tighten the joint between the end segments 130 and 150.

The dimples and/or indentations in the formations described above prevent buckling of the central sections of the formations when the formations are crimped. This eliminates the necessity for a tool having an anvil which can be placed over the central sections during the crimping process, thereby simplifying the assembly tool. Furthermore, the dimples and/or indentations strengthen the central sections of the formations and add stiffness and strength to the interconnection between the formations. An additional advantage of the dimples and/or indentations is that they prevent lateral misalignment during initial engagement of the formations and the subsequent crimping operation. Without the dimples and/or indentations, lateral alignment during the assembly process would be difficult to control. The additional dimples and/or indentations provided in the embodiments of the banding strap shown in FIGS. 3-6 prevent the extremity of the overlying end segments from noticably springing away from the underlying end segments, and thereby create a tighter joint after the crimping operation. These additional dimples and/or indentations further enhance the initial alignment and engagement of the formations prior to the crimping operation, and also further prevent any subsequent lateral movement of the underlying and overlying end segments relative to each other.

What is claimed is:

1. A strap connector for joining one part to another part for use with a vehicular exhaust system, comprising a band for encircling the parts, the band having an underlying end segment and an overlying end segment and interlinking means for joining the end segments and for tightening the band around the parts, the interlinking means including a first outwardly projecting shoulder section in the overlying end segment forming an inwardly opening bight, and a second outwardly projecting shoulder section in the underlying end segment adapted to fit into the bight of the first shoulder section, an indentation in the first shoulder section, and an indentation in the second shoulder section, the indentation in one of the shoulder sections nesting in the indentation in the other of the shoulder sections when the second shoulder section is received into the bight of the first shoulder section to prevent lateral misalignment of the end segments with respect to each other during both initial engagement and subsequent crimping together of said shoulder sections.

2. The strap connector of claim 1 wherein the indentation in the first shoulder section nests in mating relationship with the indentation in the second shoulder section.

3. The strap connector of claim 2 wherein the first and second shoulder sections each include a central portion, side portions, outer shoulders connecting the central and side portions, and inner shoulders connecting the side portions and the remainder of the band.

4. The strap connector of claim 3 wherein the indentation in the first shoulder section is formed in its central portion and the indentation in the second shoulder section is formed in its central portion.

5. The strap connector of claim 4 wherein the side portions of each shoulder section are generally S-shaped in cross section, the distance between the inner shoulders of each shoulder section being generally less than the distance between the outer shoulders of each shoulder section, thus allowing the second shoulder section to be snapped into the bight of the first shoulder section.

6. The strap connector of claim 4, further comprising a pair of shoulder indentations formed in the inner shoulders of both the first and second shoulder sections, the pair of shoulder indentations in the first shoulder section nesting in mating relationship with the pair of shoulder indentations on the second shoulder section wherein the second shoulder section is received into the bight of the first shoulder section.

7. The strap connector of claim 4, further comprising a pair of elongated longitudinal indentations formed in both the first and second shoulder sections, the longitudinal indentations in the first shoulder section nesting in mating relationship with the longitudinal indentations in the second shoulder section when the second shoulder section is received into the bight of the first shoulder section.

8. The strap connector of claim 7 wherein a first longitudinal indentation in each shoulder section extends from the indentation in the central portion thereof, through one outer shoulder, along one side portion, through one inner shoulder, and along an extremity of the end segment, a second longitudinal indentation in each shoulder section extends from the indentation in the central portion thereof, through the other outer shoulder, along the other side portion, through the other inner shoulder, and along the band toward the other shoulder section.

9. The strap connector of claim 3 wherein the bight of the first shoulder section has a reduced opening for snapping the second shoulder section into the bight.

10. The strap connector of claim 9 wherein the reduced opening in the bight of the first shoulder section is produced by generally S-shaped side portions wherein the distance between the inner shoulders is generally less than the distance between the outer shoulders and the second shoulder section also includes generally S-shaped side portions.

11. The strap connector of claim 9 wherein the reduced opening in the bight of the first shoulder section is produced by shoulder indentations formed in the inner shoulders thereof, the second shoulder section also including shoulder indentations in its inner shoulders which nest in mating relationship with the shoulder indentations of the first shoulder section when the second shoulder section is received into the bight of the first shoulder section.

12. A band for joining one part to another part for use in a vehicular exhaust system, comprising a strap for encircling both of the parts, the strap including an underlying end segment and an overlying end segment, the overlying end segment including a first outwardly projecting formation having an inwardly opening bight, the underlying end segment including a second outwardly projecting formation receivable into the bight of the first formation, and indentations in the first and second formations nesting in mating relationship when the second formation is received into the bight of the first formation, the formations including shoulder sections providing abutments for crimping the first and second formations to interlock the end segments and tighten the strap around the parts, the indentations preventing lateral misalignment of the end segments with respect to each other during both initial engagement and subsequent crimping together of said shoulder sections.

13. The band of claim 12 wherein each formation includes a central section, side sections, a pair of outer shoulder sections between the central section and the side sections, and a pair of inner shoulder sections between the side sections and the remainder of the strap.

14. The band of claim 13 wherein the indentations project inwardly and are formed in the central sections of the first and second formations.

15. The band of claim 14, further comprising a pair of inwardly projecting shoulder indentations formed in the inner shoulder sections of each outwardly projecting formation.

16. The band of claim 15, further comprising a pair of inwardly projecting longitudinal indentations extending in opposite directions from the indentation in the central section of each formation.

17. In combination with a vehicle exhaust muffler, means for joining a heat shield to the muffler, comprising a strap for encircling the muffler and heat shield, the strap including an underlying end segment and an overlying end segment, the overlying end segment including an outwardly projecting formation having an inwardly opening bight, the underlying end segment including an outwardly projecting formation adapted to be received into the bight of the formation in the overlying end segment to interconnect the end segments, a dimple in the formation of the underlying end segment, a dimple in the formation of the overlying end segment nesting in mating relationship with the dimple in the underlying end segment when the formation of the underlying end segment is received in the bight of the formation of the overlying end segment, the formations including shoulder sections providing abutments for crimping the formations to interlock the end segments and tighten the strap around the muffler and heat shield, the indentations preventing lateral misalignment of the end segments during the crimping operation during both initial engagement and subsequent crimping together of said shoulder sections.

18. A strap connector for joining one part to another part, comprising a band for encircling the parts, the band having an underlying end segment and an overlying end segment and interlinking means for joining the end segments and for tightening the band around the parts, the interlinking means including a first outwardly projecting shoulder section in the overlying end segment forming an inwardly opening bight, and a second outwardly projecting shoulder section in the underlying end segment adapted to fit into the bight of the first shoulder section, an indentation in the first shoulder section, and an indentation in the second shoulder section, the indentation in one of the shoulder sections nesting in the indentation in the other of the shoulder sections when the second shoulder section is received into the bight of the first shoulder section to prevent lateral misalignment of the end segments with respect to each other during both initial engagement and subsequent crimping together of said shoulder sections.

19. The strap connector of claim 18 wherein the indentation in the first shoulder section nests in mating relationship with the indentation in the second shoulder section.

20. The strap connector of claim 19 wherein the first and second shoulder sections each include a central portion, side portions, outer shoulders connecting the central and side portions, and inner shoulders connecting the side portions and the remainder of the band.

21. The strap connector of claim 20 wherein the identation in the first shoulder section is formed in its central portion and the indentation in the second shoulder section is formed in its central portion.

22. The strap connector of claim 21 wherein the side portions of each shoulder section are generally S-shaped in cross section, the distance between the inner shoulders of each shoulder section being generally less than the distance between the outer shoulders of each shoulder section, thus allowing the second shoulder section to be snapped into the bight of the first shoulder section.

23. The strap connector of claim 21, further comprising a pair of shoulder indentations formed in the inner shoulders of both the first and second shoulder sections, the pair of shoulder indentations in the first shoulder section nesting in mating relationship with the pair of shoulder indentations on the second shoulder section wherein the second shoulder section is received into the bight of the first shoulder section.

24. The strap connector of claim 21, further comprising a pair of elongated longitudinal indentations formed in both the first and second shoulder sections, the longitudinal indentations in the first shoulder section nesting in mating relationship with the longitudinal indentations in the second shoulder section when the second shoulder section is received into the bight of the first shoulder section.

25. The strap connector of claim 24 wherein a first longitudinal indentation in each shoulder section extends from the indentation in the central portion thereof, through one outer shoulder, along one side portion, through one inner shoulder, and along an extremity of the end segment, a second longitudinal indentation in each shoulder section extends from the indentation in the central portion thereof, through the other outer shoulder, along the other side portion, through the other inner shoulder, and along the band toward the other shoulder section.

26. The strap connector of claim 20 wherein the bight of the first shoulder section has a reduced opening for snapping the second shoulder section into the bight.

27. The strap connector of claim 26 wherein the reduced opening in the bight of the first shoulder section is produced by generally S-shaped side portions wherein the distance between the inner shoulders is generally less than the distance between the outer shoulders and the second shoulder section also includes generally S-shaped side portions.

28. The strap connector of claim 26 wherein the reduced opening in the bight of the first shoulder section is produced by shoulder indentations formed in the inner shoulders thereof, the second shoulder section also including shoulder indentations in its inner shoulders which nest in mating relationship with the shoulder indentations of the first shoulder section when the second shoulder section is received into the bight of the first shoulder section.

* * * * *